June 24, 1930.  B. M. LINVILLE  1,765,683
CORN PLANTER FERTILIZING DRILL ATTACHMENT
Filed May 12, 1928   3 Sheets-Sheet 1
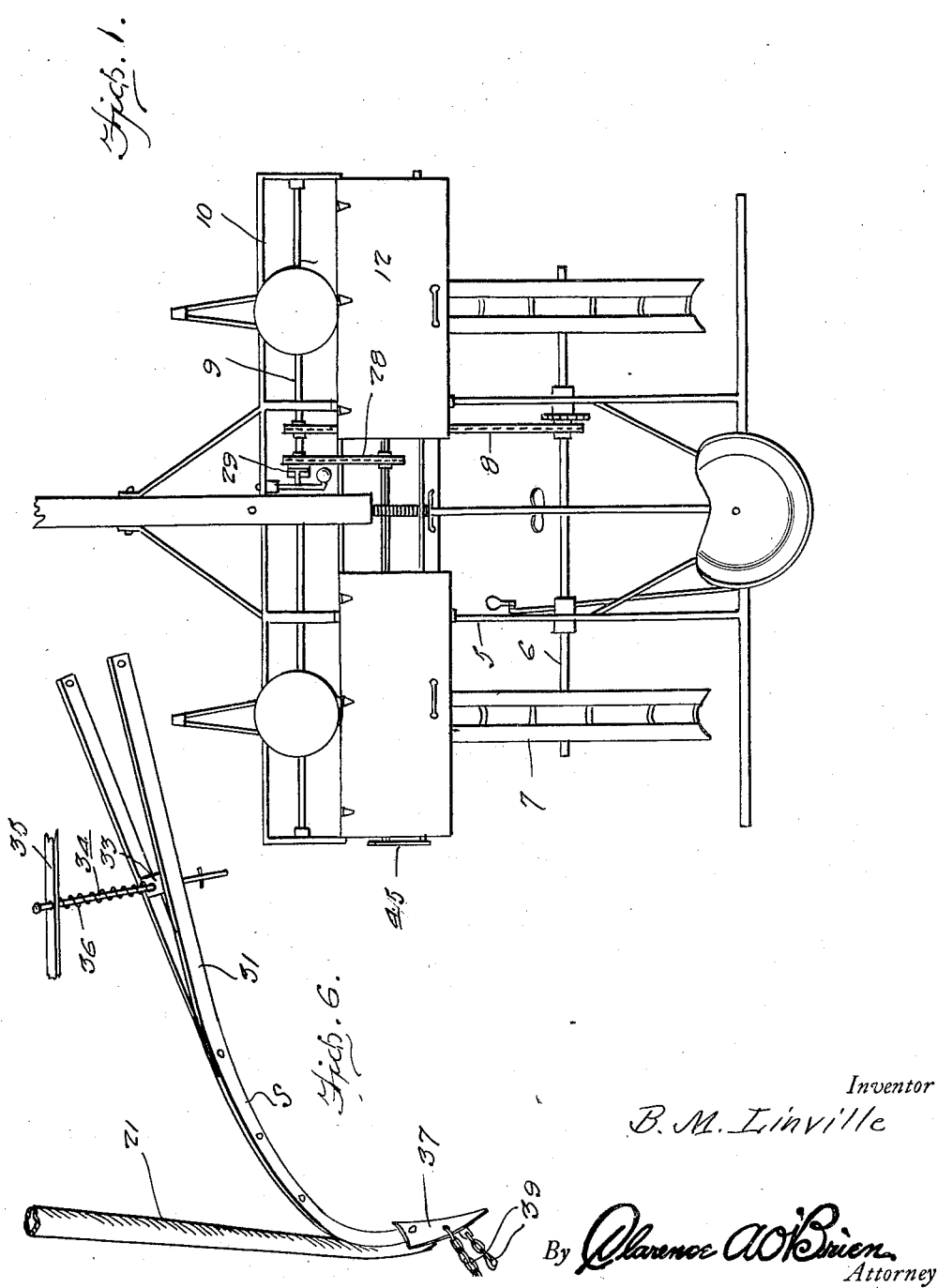
Inventor
B. M. Linville
By Clarence A. O'Brien
Attorney

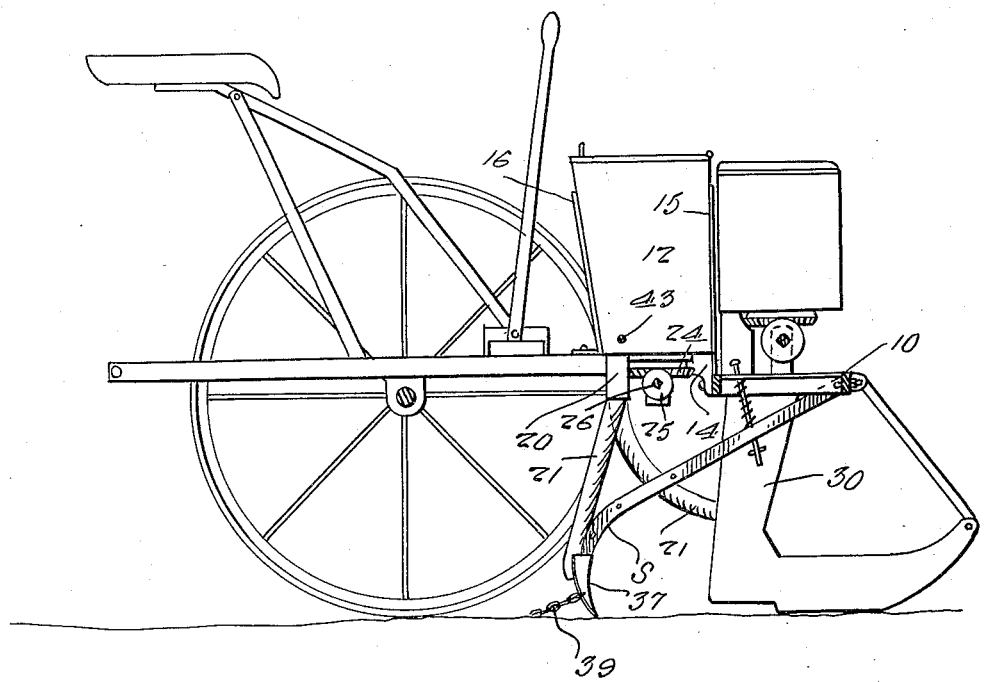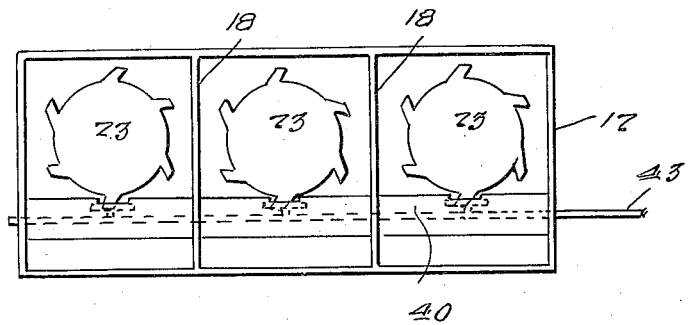

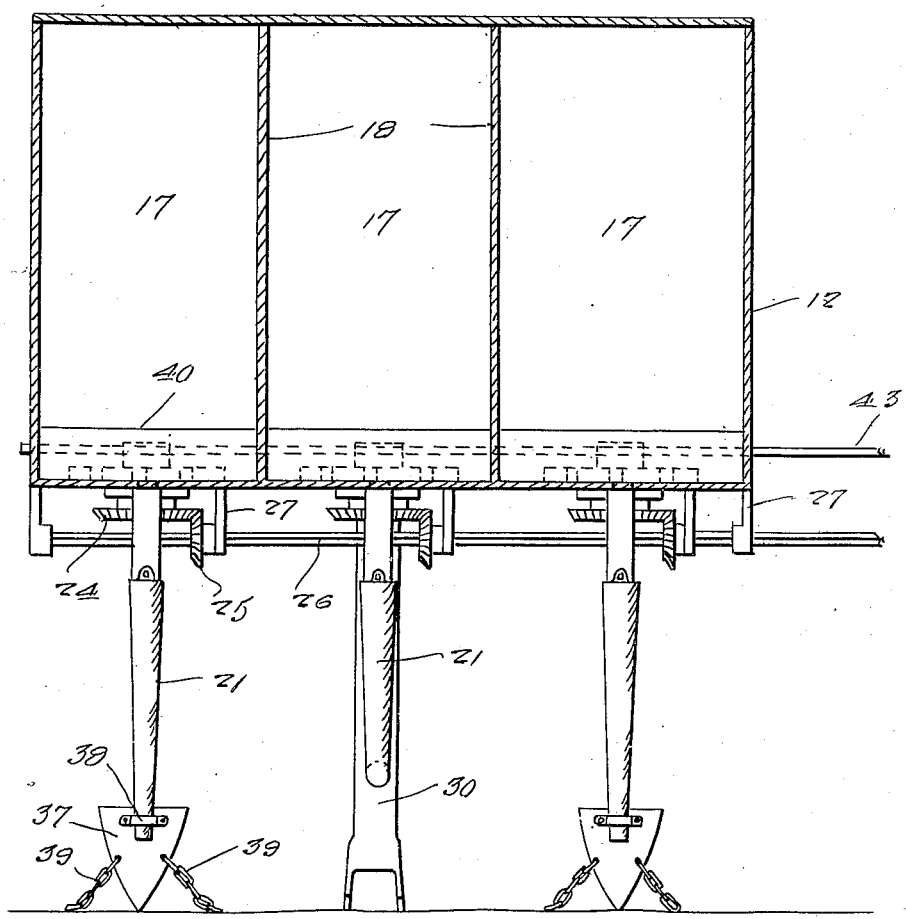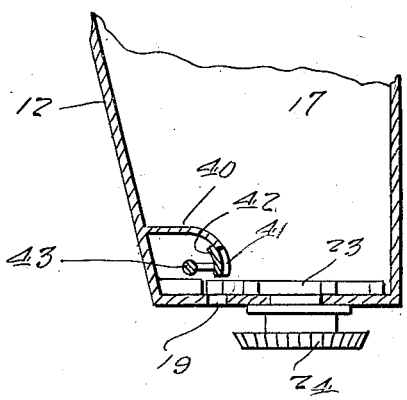

Patented June 24, 1930

1,765,683

UNITED STATES PATENT OFFICE

BEN M. LINVILLE, OF MECHANICSBURG, OHIO

CORN-PLANTER FERTILIZING-DRILL ATTACHMENT

Application filed May 12, 1928. Serial No. 277,124.

The present invention relates to a fertilizer drill attachment for corn planters and has for its prime object to provide a structure whereby fertilizer may be distributed in the ground to the sides of the corn being planted and also with the corn being planted.

Another very important object of the invention resides in the provision of a fertilizer drill attachment of this nature which may be mounted on any of the well known forms of corn planters.

Another very important object of the invention resides in the provision of an attachment of this nature, whereby different kinds of fertilizer may be utilized.

A still further very important object of the invention resides in the provision of an attachment of this nature, which is simple in its construction, inexpensive to manufacture and install, strong and durable, compact and convenient, and thoroughly efficient and reliable in operation.

With the above and numerous other objects in view as will appear as the description proceeds, the invention resides in certain novel features of construction and in the combination and arrangement of parts as will be hereinafter more fully described and claimed.

In the drawings:

Figure 1 is a fragmentary top plan view of the corn planter showing my improved attachment structure incorporated therewith.

Figure 2 is a side elevation thereof.

Figure 3 is a vertical transverse section taken through one of the fertilizer containers.

Figure 4 is a top plan view of one of the containers with the cover removed.

Figure 5 is a detail section through the lower portion of one compartment of one of the containers, and Figure 6 is a perspective view of one of the shovels and the shank and associated structure thereof.

Referring to the drawings in detail, it will be seen that the numeral 5 denotes the frame of a coventional corn planter mounted on an axle shaft 6, to which is fixed the usual wheels 7. A chain and sprocket mechanism 8 operatively connects the shaft 6 with a shaft 9 in a cross frame 10, for operating the planter mechanism in the usual well known manner. All of the parts thus far described are conventional and have been illustrated merely to bring out an exemplification of the utility and advantages of my improved attachment.

Two fertilizer containers 12 are mounted on the cross frame 10, by means of brackets 14 being suitably braced as at 15 and 16, the braces 15 rising from the rear of the cross frame 10 and the brace 16 rising from the main frame 5.

Each container 12 is divided into three compartments 17 by means of the partitions 18. An opening 19 is provided in the bottom of each compartment and has a rigid conduit 20, depending downwardly therefrom, with which is connected a flexible conduit 21. A finger feed plate 23 is rotatably mounted in the bottom of each compartment being actuated by a gear 24 connected thereto. The gears 24 mesh with the gears 25, on a shaft 26, journaled in bearings 27 depending from the containers. This shaft 26 is operatively connected with the shaft 9, by means of the chain and sprocket mechanism 28. A suitable clutch mechanism 29 is associated with the chain and sprocket mechanism 28. The flexible conduit 21 leading from the central compartments 17 enter intermediate portions of the boots 30 of the planter mechanism. Shanks F comprise two bars 31, which are fixed together, adjacent their lower ends, while their upper ends diverge from each other. The upper ends of these bars are pivotally engaged on the forward portions of the cross frames 10. A cross bar 23 extends between the upper portions of the bars 31, and has a rod 34 slidable therethrough and slidable through a portion 35 of the cross frame 10, and a spring 36 is disposed about this rod impinging against this portion 35 and the cross bar 33. At the lower end of the shank there is provided a shovel 37. The flexible conduits 21 of the end compartments of the containers 12 lead to the rears of the shovels or hoes 37, and are clamped thereto as is indicated at 38. A pair of chains 39 are engaged with each hoe 37, to assist in properly mixing the fertilizer with the soil.

In order to regulate the amount of fertilizer flowing through the conduits, I provide a shield 40 extending across the rear of the bottom of each container 12. This shield extends above the openings 19. The shield is provided with openings 41, through which the fertilizer may pass, and valves 42 are associated with these openings 41 and are mounted on a shaft 43, which may be controlled by a crank 45.

From the above detailed description, it will be seen that I have devised an appliance which may be incorporated in the well known corn planter structures, whereby fertilizer may be dropped in the hills or scattered continuously in the drill row and brought between hills or in spaces between drill rows of corn in the same operation. The appliance is so fitted to the planter as to be driven by the axle shaft thereof and may be thrown out by operation of the clutch. The containers are of such construction that different kinds of fertilizer may be used, if desired. The present embodiment of the invention has been disclosed in considerable detail merely for the purpose of exemplification, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. In combination with a corn planter including planting mechanism having a pair of boots associated therewith, of an attachment comprising a pair of containers one container for each of said boots, conduits leading from the container to the respective boot for conveying fertilizer from the containers to said boots, a plurality of shovels, one to each side of each boot, and additional conduits leading from said containers for delivering fertilizer to the rear of said shovels.

2. In combination with a corn planter including planting mechanism having a pair of boots associated therewith, of an attachment comprising a pair of containers, one container for each of said boots, conduits leading from the container to the respective boot for conveying fertilizer from the containers to said boots, a plurality of shovels, one to each side of said boot, and additional conduits leading from said containers for delivering fertilizer to the rear of said shovels, and means for regulating the flow of fertilizer from the containers.

3. In combination with a corn planter including planting mechanism having a pair of boots associated therewith, of an attachment comprising a pair of containers one container for each of said boots, conduits leading from the container to the respective boot for conveying fertilizer from the containers to said boots, a plurality of shovels, one to each side of each boot, and additional conduits leading from said containers for delivering fertilizer to the rear of said shovels, and means for regulating the flow of fertilizer from the containers, each of said containers being divided into compartments, said first mentioned conduit communicating with the intermediate compartments of the respective containers, and the last mentioned conduits leading from the end compartments of the respective containers.

4. In combination with a corn planter including planting mechanism having a plurality of boots associated therewith, an attachment comprising a plurality of containers, a plurality of shovels, one to each side of each boot, each of said containers being divided into a plurality of compartments so that different brands of fertilizer may be distributed therefrom, and there being one container for each boot, means for conveying fertilizer from one compartment of each of said containers to the respective boots, means for delivering fertilizer to the rear of each of said shovels from the remaining compartments of said containers, means for regulating the flow of fertilizer from the containers, means operatively connecting said last mentioned means to the planter mechanism to be actuated thereby.

5. In combination with a corn planter including planting mechanism having a plurality of boots associated therewith, an attachment comprising a plurality of containers, a plurality of shovels, one to each side of each boot, each of said containers being divided into a plurality of compartments so that different brands of fertilizer may be distributed therefrom, and there being one container for each boot, means for conveying fertilizer from one compartment of each of said containers to the respective boots, means for delivering fertilizer to the rear of each of said shovels form the remaining compartments of said containers, means for regulating the flow of fertilizer from the containers, means operatively connecting said last mentioned means to the planter mechanism to be actuated thereby, each of said shovels having a shank pivotedly engaged on the planter, and means urging the shank downwardly.

6. In combination with a corn planter including planting mechanism having a plurality of boots associated therewith, an attachment comprising a plurality of containers, a plurality of shovels, one to each side of each boot, each of said containers being divided into a plurality of compartments so that different brands of fertilizer may be distributed therefrom, and there being one container for each boot, means for conveying fertilizer from one compartment of each of said containers to the respective boots, means for delivering fertilizer to the rear of each of said shovels form the remaining compartments of said containers, means for regulating the flow of fertilizer from the containers, means operatively connecting said last mentioned means to the planter mechanism to be actuated thereby, each of said shovels having a shank pivotally engaged on the planter, and means urging the shank downwardly, and auxiliary means carried by each of said shovels to assist in mixing the fertilizer with the soil.

In testimony whereof I affix my signature.

BEN M. LINVILLE.